United States Patent
Winkelbach et al.

(10) Patent No.: US 7,696,433 B2
(45) Date of Patent: Apr. 13, 2010

(54) CABLE OUTLET ELEMENT, CABLE OUTLET DEVICE, CABLE OUTLET ARRANGEMENT, METHOD FOR PRODUCING A CABLE ELEMENT AND THE USE OF A CABLE OUTLET ELEMENT IN AN AIRCRAFT

(75) Inventors: Horst Winkelbach, Buchholz (DE); Rene Gensler, Buxtehude (DE); Peter Platte, Hamburg (DE)

(73) Assignee: Airbus Deutschland GmbH (DE)

( * ) Notice: Subject to any disclaimer, the term of this patent is extended or adjusted under 35 U.S.C. 154(b) by 248 days.

(21) Appl. No.: 11/660,439

(22) PCT Filed: Sep. 22, 2005

(86) PCT No.: PCT/EP2005/010289
§ 371 (c)(1),
(2), (4) Date: Feb. 15, 2007

(87) PCT Pub. No.: WO2006/032513
PCT Pub. Date: Mar. 30, 2006

(65) Prior Publication Data
US 2007/0251714 A1 Nov. 1, 2007

Related U.S. Application Data
(60) Provisional application No. 60/612,035, filed on Sep. 22, 2004.

(30) Foreign Application Priority Data
Sep. 22, 2004 (DE) ............... 10 2004 045 964

(51) Int. Cl.
*H02G 3/04* (2006.01)

(52) U.S. Cl. ............ 174/68.1; 174/481; 174/72 A; 174/68.3; 52/220.3; 52/220.7

(58) Field of Classification Search ......... 174/480, 174/481, 135, 68.1, 68.3, 72 A, 95, 97, 99 R, 174/96, 72 R, 71 R; 220/3.2, 3.8; 385/134, 385/135; 52/220.1, 220.3, 220.7, 220.5, 52/220.8, 249; 439/207, 209–213
See application file for complete search history.

(56) References Cited

U.S. PATENT DOCUMENTS 5,469,893 A * 11/1995 Caveney et al. ............ 174/68.3

(Continued)

FOREIGN PATENT DOCUMENTS

CN 2258673 Y 7/1997

(Continued)

*Primary Examiner*—Angel R Estrada
(74) *Attorney, Agent, or Firm*—Lerner, David, Littenberg, Krumholz & Mentlik, LLP (57) ABSTRACT

A cable outlet element (101) for leading out a cable (106) that can be muted through a raceway arrangement (105) comprises a cable lead-in section (101), a raceway arrangement connection (102), a cable lead-out section (103) and a cable outlet connection (104). The raceway arrangement connection (102) can be connected to a raceway arrangement (105) such that a cable (106) that can be routed through the raceway arrangement (105) can be fed into the cable lead-in section (101). To jointly form a cable outlet aperture the cable outlet connection (104) can be connected to a cable outlet connection (111) of another cable outlet element (107) such that at the connected cable outlet connections (104,111) a cable (106) fed into the cable lead-in section (101) can be led out through the jointly formed cable outlet aperture.

17 Claims, 11 Drawing Sheets

U.S. PATENT DOCUMENTS

| | | | |
|---|---|---|---|
| 5,929,380 A * | 7/1999 | Carlson et al. | 174/68.3 |
| 6,284,975 B1 * | 9/2001 | McCord et al. | 174/71 R |
| 6,459,038 B1 | 10/2002 | Waszak et al. | |
| 6,677,533 B2 * | 1/2004 | Bernard et al. | 174/68.3 |
| 6,756,539 B1 * | 6/2004 | VanderVelde | 174/97 |
| 6,756,544 B2 * | 6/2004 | Handler | 174/68.1 |
| 6,875,916 B2 | 4/2005 | Winkelbach et al. | |
| 7,049,508 B2 * | 5/2006 | Bushey et al. | 174/481 |
| 7,154,051 B2 * | 12/2006 | Mathieu | 174/480 |

FOREIGN PATENT DOCUMENTS

| | | |
|---|---|---|
| DE | 102 48 241 | 5/2004 |
| EP | 1 289 088 | 3/2003 |
| JP | 62-239807 A | 10/1987 |
| JP | 5-050935 U | 7/1993 |
| JP | 5-087755 U | 11/1993 |
| JP | 9-002126 A | 1/1997 |
| JP | 2000-197238 A | 7/2000 |
| JP | 2001-112141 A | 4/2001 |

* cited by examiner

CABLE OUTLET ELEMENT, CABLE OUTLET DEVICE, CABLE OUTLET ARRANGEMENT, METHOD FOR PRODUCING A CABLE ELEMENT AND THE USE OF A CABLE OUTLET ELEMENT IN AN AIRCRAFT

This application claims the benefit of the filing date of U.S. Provisional Patent Application No. 60/612,035 filed Sep. 22, 2004 and of German Patent Application No. 10 2004 045 964.9 filed Sep. 22, 2004, the disclosure of both applications is hereby incorporated herein by reference.

The invention relates to a cable outlet element, a cable outlet device, a cable outlet arrangement, a method for producing a cable outlet element and the use of a cable outlet element in an aircraft.

In a modern passenger aircraft it is necessary to route electrical cables to many electronic application devices to provide electrical energy or electrical signals to such application devices. In particular, in passenger aircraft it is necessary to provide cabling right up to the individual seats and between the seats of a passenger entertainment system (PES).

However, the desired level of comfort and convenience in an aircraft dictates that such cables are not routed so that they are exposed, but instead so that they are hidden and thus invisible.

According to the state of the art, such a cabling arrangement is achieved in that a raceway is provided which serves as a cable accommodation device in whose interior a cable can be routed to an electrical device. In other words a cable is routed in the interior of such a raceway. In order to lead a cable that is routed in such a raceway to an electrical device, according to the state of the art, a region of the raceway is milled out or notched out. In this way an aperture is formed in the raceway through which aperture a cable can be led out of the raceway and can be routed to a terminal device.

In order to prevent undesirable damage to the electrical insulation of a cable, caused by a sharp edge at such a milled out hole, and in order to reduce any danger of personal injury, according to the state of the art such a sharp edge must be deburred in a complex process. Furthermore, the dimension and shape of such a hole need to be matched to a cable to be led out of said hole; a process which requires manual and thus expensive treatment. Constructing such outlet apertures in a raceway for a special customer version is complex and requires an expensive single item production system. Moreover, such one-off production of outlet apertures results in the possibility of bottlenecks and downtimes occurring in production and in final assembly. However, for cost reasons it is important that a finished aircraft can be brought into service as quickly as possible because any loss of productive time represents a significant cost factor.

Another problem with manually milled-out cable leadthroughs in a raceway relates to the possibility of design errors occurring when determining the cable outlets, as well as production faults during manufacture of the one-off parts, and thus quality problems during installation.

According to the state of the art such a raceway can be provided as a semifinished product, 3 m in length, made of polyamide, which for seat-to-seat cabling has to be cut to size and notched out anew for each aircraft, depending on customer layout. This is complex in relation to design and production and leads to bottlenecks and disturbance in the final assembly line (FAL).

Thus for implementing seat-to-seat cabling, in aircraft of the Airbus families too, according to the state of the art, raceways, i.e. extruded profiles, are used which consist of and/or comprise a top part and a bottom part as well as end caps. For cable routing to the seat these raceways are notched out in the workshop.

It is an object of the invention to be able to lead out a cable routed in a raceway arrangement with reduced expenditure of time and energy and to be able to feed said cable to an electrical device.

This object is met by a cable outlet element, a cable outlet device, a cable outlet arrangement, a method for producing a cable outlet element, and by the use of a cable outlet element in an aircraft with the characteristics according to the independent claims.

The cable outlet element according to the invention, for leading out a cable that can be routed through a raceway arrangement, comprises a cable lead-in section, a raceway arrangement connection, a cable lead-out section and a cable outlet connection. The raceway arrangement connection can be connected to a raceway arrangement in such a way that a cable that can be routed through the raceway arrangement can be fed into the cable lead-in section. For mutual forming of a cable outlet aperture the cable outlet connection can be connected to a cable outlet connection of another cable outlet element in such a way that at the connected cable outlet connections a cable fed into the cable lead-in section can be led out through the jointly formed cable outlet aperture.

The cable outlet device according to the invention comprises a first cable outlet element with the features described above and comprises a second cable outlet element with the features described above. The cable outlet connection of the first cable outlet element is connectable or connected to the cable outlet connection of the second cable outlet element to jointly form the cable outlet aperture in such a way that on the connected cable outlet connections a cable which is fed into at least one of the cable lead-in sections can be led out through the jointly formed cable outlet aperture.

Furthermore, according to the invention a cable outlet arrangement is created which comprises a cable outlet device with the features described above, a first raceway arrangement through which a cable can be routed, and a second raceway arrangement through which a cable can be routed. The first raceway arrangement is connectable or connected to the raceway arrangement connection of the first cable outlet element, and the second raceway arrangement is connectable or connected to the raceway arrangement connection of the second cable outlet element.

Moreover, according to the invention a method for producing a cable outlet element for leading out a cable that can be routed through a raceway arrangement is provided in which method a cable lead-in section is formed, a raceway arrangement connection is formed, a cable lead-out section is formed, and a cable outlet connection is formed. The raceway arrangement connection is formed in such a way that it can be connected to a raceway arrangement in such a way that a cable that can be routed through the raceway arrangement can be fed into the cable lead-in section. For the mutual forming of a cable outlet aperture the cable outlet connection is formed in such a way that it can be connected to a cable outlet connection of another cable outlet element in such a way that at the connected cable outlet connections a cable fed into the cable lead-in section can be led out through the jointly formed cable outlet aperture.

Furthermore, according to the invention a cable outlet element with the features described above is used in an aircraft.

A fundamental idea of the invention consists of creating a cable outlet element that by way of a cable lead-in section and a raceway arrangement connection is connectable to, in particular plugged to, a raceway arrangement and a cable routed therein. At a cable lead-out section the cable can be led out of the cable outlet element preferably so as to be essentially orthogonal in relation to a routing direction of the cable in the raceway arrangement, and at a cable outlet connection the cable outlet element is connectable to another cable outlet element. The other cable outlet element can be designed in a way that is very similar to the viewed cable outlet element itself. This results in a modular design that can be produced economically, comprising two easy-to-install cable outlet elements at whose connection position an outlet aperture for preferably vertically leading out a cable is formed.

The cable outlet element according to the invention can for example be an injection-moulded polyamide component so that in this way there is no need for complex production of one-off parts by means of milling out lead-out apertures. In this way operational procedures are streamlined and the costs for routing a cable through a raceway arrangement and out of a cable outlet are reduced. The cable outlet element can be delivered from a producer and/or from a store directly to the place of installation so that there is no need for complex manual one-off construction.

Advantageously the cable outlet element according to the invention can be used for routing cables for a passenger entertainment system (PES) in an aircraft in order to route cables to electronic devices of the passenger entertainment system in the surrounding region of a passenger seat so that the cables are covered up.

The invention saves work in the workshop. An economical injection-moulded finished part can be used as a cable outlet element so that a cable outlet is formed with which cables can be routed to a seat and/or routed away from a seat. According to the invention there is no need for complex deburring of sharp milling edges.

The outsides of the cable outlet element are preferably matched to the contour of the raceway geometry, i.e. of a raceway arrangement. This ensures an elegant and aesthetically pleasing transition to the raceways. Such a cable outlet element can be slidably pushed onto a bottom rail similar to a raceway arrangement and can be routed to a desired position underneath an electronic device to be contacted, for example underneath a passenger seat which is equipped with a passenger entertainment system.

The cable outlet element of the invention can be adapted to and produced for all types in a fleet of an aircraft producer. It can for example be made for a single-aisle series, which often comprises only a single raceway profile, or for a long-range series (an aircraft for long-haul flights) in which for example a dual, treble or quintuple raceway with several cables can be provided.

In the cable outlet device of the invention a pair of cable outlet elements of essentially identical construction can be used, which cable outlet elements are plugged into each other or pushed onto each other. In the plugged (connected) variant better mutual rigidity of the parts is obtained. To form a plug-in connection the two cable outlet elements need to have plug-in elements that match each other. It is advantageous to design the two cable outlet elements to be connected in such a way that their upper surfaces rise towards the outlet aperture. In this way a larger cable bending radius can be handled, and the cable outlet aperture can be kept sufficiently small. A small cable outlet aperture provides an advantage in that it is not visible underneath a seat or in that it is at least not conspicuous, which is advantageous for aesthetic reasons.

When designing the cable outlet elements the minimum bending radius of the cables that are used should be taken into account. Preferably the minimum bending radius is at least six times the cable diameter. In the case of a cable diameter of (a maximum of) 10 mm a bending radius of (a maximum of) 60 mm should be maintained.

The invention provides advantages in that with the use of prefabricated plastic components the manufacturing process for cable outlet elements for aircraft can be accelerated. Workshop procedures that are complex because they have to be carried out manually are thus no longer required. In a single-aisle program, which for example comprises two times sixty seat rows, and even more so in a long-range program, the work required for routing cables in an aircraft can be significantly reduced. Furthermore, the cable outlet element of the invention can be produced economically. Moreover, in a way that differs from that of the state of the art, according to the invention there is no need for a cable outlet element that is milled out from a raceway arrangement to be deburred; a process that is complex. Moreover, with the use of the cable outlet components according to the invention the quality of the entire raceway arrangement in the aircraft is enhanced. Passengers are protected from any danger posed by exposed milling edges. There is no undesirable damage of cable insulation due to sharp milling edges. There is a particularly important advantage in that installation time is significantly reduced so that the aircraft can be delivered earlier.

Preferred embodiments of the invention are shown in the dependent claims.

Below, embodiments of the cable outlet element according to the invention are described. These embodiments also apply to the cable outlet device, the cable outlet arrangement, the method for producing a cable outlet element and the use of a cable outlet element in an aircraft.

The cable outlet element can comprise a push-on connection which is designed in such a way that with it the cable outlet element can be pushed onto a guide rail. According to this embodiment the cable outlet element can be plugged onto a guide rail provided on a base area (for example the floor in the passenger compartment of an aircraft), on which guide rail a raceway arrangement can also be pushed on. With the use of such a guide rail the cable outlet element can be installed with little effort, and a direction of extension of the cable can be specified.

The push-on connection can be designed such that with it the cable outlet element can be slidably pushed onto a guide rail. By means of sliding the cable outlet element onto a guide rail the installation can be effected particularly easily and economically. The individual components of a cable outlet arrangement, namely two cable outlet elements and two raceway arrangements, can in a convenient way be sequentially pushed onto the guide rail and be slid along the guide rail in order to become engaged with each other in an effective connection.

The cable lead-in section can be designed to lead in one cable or a plurality of cables. In particular, cable raceway arrangements can be designed to route one, two, three or five cables.

The cable lead-out section can be designed to lead out one cable or a plurality of cables. In particular, cable outlet elements can be provided for leading out one, two, three or five cables.

The cable outlet connection can comprise a plug-in element which is designed such that it can be made to engage a plug-in element of a cable outlet connection of another cable outlet element so as to form a plug-in connection. A plug-in connection established by the engagement of two matching cable outlet elements provides a configuration that is mechanically particularly stable. As corresponding plug-in elements, one cable outlet element can comprise a groove, and the other cable outlet element can comprise a correspondingly matched projection so that the projection can be fed into the groove, thus providing a plug-in connection. Also possible are a click-connection, an adhesive connection, a magnetic connection or similar.

The cable lead-out section of the cable outlet element can be designed to lead out a cable at the top of the cable outlet element. According to this embodiment the raceway arrangement or the cable outlet element can be arranged so as to extend horizontally along a bottom surface, and the cable can be led out of the cable outlet element in vertical direction in relation to the base area.

At the top the cable outlet element can be designed so as to be inclined such that the surface slants downwards from the cable lead-out section to the cable lead-in section. In that the surface of the cable outlet element, i.e. a cover surface of the cable outlet element, rises from the cable lead-in section to the cable lead-out section, a cable can already be bent in this rising section so that the cable can be led out at an adequately large bending radius.

The cable outlet element can be made in one piece, i.e. from a single component, for example as an injection-moulded part. Furthermore, the cable outlet element can be made of a single material, for example from an economical plastic material. According to these embodiments the cable outlet element can be produced particularly economically.

Below, an embodiment of the cable outlet device according to the invention is described. This embodiment also applies to the cable outlet element, the cable outlet arrangement, the method for producing a cable outlet element and the use of a cable outlet element in an aircraft.

In the cable outlet device, at the connection between the cable outlet connection of the first cable outlet element and the cable outlet connection of the second cable outlet element the cable outlet aperture can be formed at the top of the cable outlet device. This cable outlet aperture can for example be formed in that two cable outlet elements comprising a U-shaped recess are arranged adjoining at the cover surface in such a way that the two U-shaped recesses form an aperture that is directed upwards.

Below, an embodiment of the method according to the invention for producing a cable outlet element is described. This embodiment also applies to the cable outlet element, the cable outlet device, the cable outlet arrangement and the use of a cable outlet element in an aircraft.

The cable outlet element can be produced as an injection-moulded part, in particular from a plastic material such as polyamide. This may result in particularly economical production.

Below, embodiments of the use according to the invention are described. These embodiments also apply to the cable outlet element, the cable outlet device, the cable outlet arrangement and the method for producing a cable outlet element.

The cable outlet element can be used for feeding a cable to a seat in an aircraft. For this use the cable outlet element is particularly well suited since in an aircraft quick and cost-effective routing of the electrical cables is required. In this way an aircraft can enter service more quickly after it has been produced, and, in the aircraft, routing of cables for contacting electrical devices in the region surrounding a seat can be carried out particularly economically.

In particular, the cable outlet element can be used for feeding a cable to a passenger entertainment system in the seat of an aircraft.

Embodiments of the invention are shown in the figures and are described in more detail below.

The following are shown.

Unless otherwise indicated in the description or in the figures, the drawings in the figures are diagrammatic and not to scale.

Different components in different figures have the same reference signs.

Below, with reference to FIG. 1 a cable outlet element 100 according to a first embodiment of the invention is described.

The cable outlet element 100 is designed to lead out a cable 106 that can be fed through a raceway arrangement 105. The cable outlet element 100 comprises a cable lead-in section 101, a raceway arrangement connection 102, a cable lead-out section 103 and a cable outlet connection 104. The raceway arrangement connection 102 is connectable to a raceway arrangement 105 in such a way that a cable 106 routed through the raceway arrangement 105 is fed in at the cable lead-in section 101. The cable outlet connection 104 is connectable or connected to another cable outlet connection 111 of another cable outlet element 107 in such a way that at the connected cable outlet connections 104, 111 a cable 106 fed into the cable lead-in section 101 is led out through a rectangular cable lead-out aperture 114 perpendicular to the drawing plane of FIG. 1.

Figure 1:
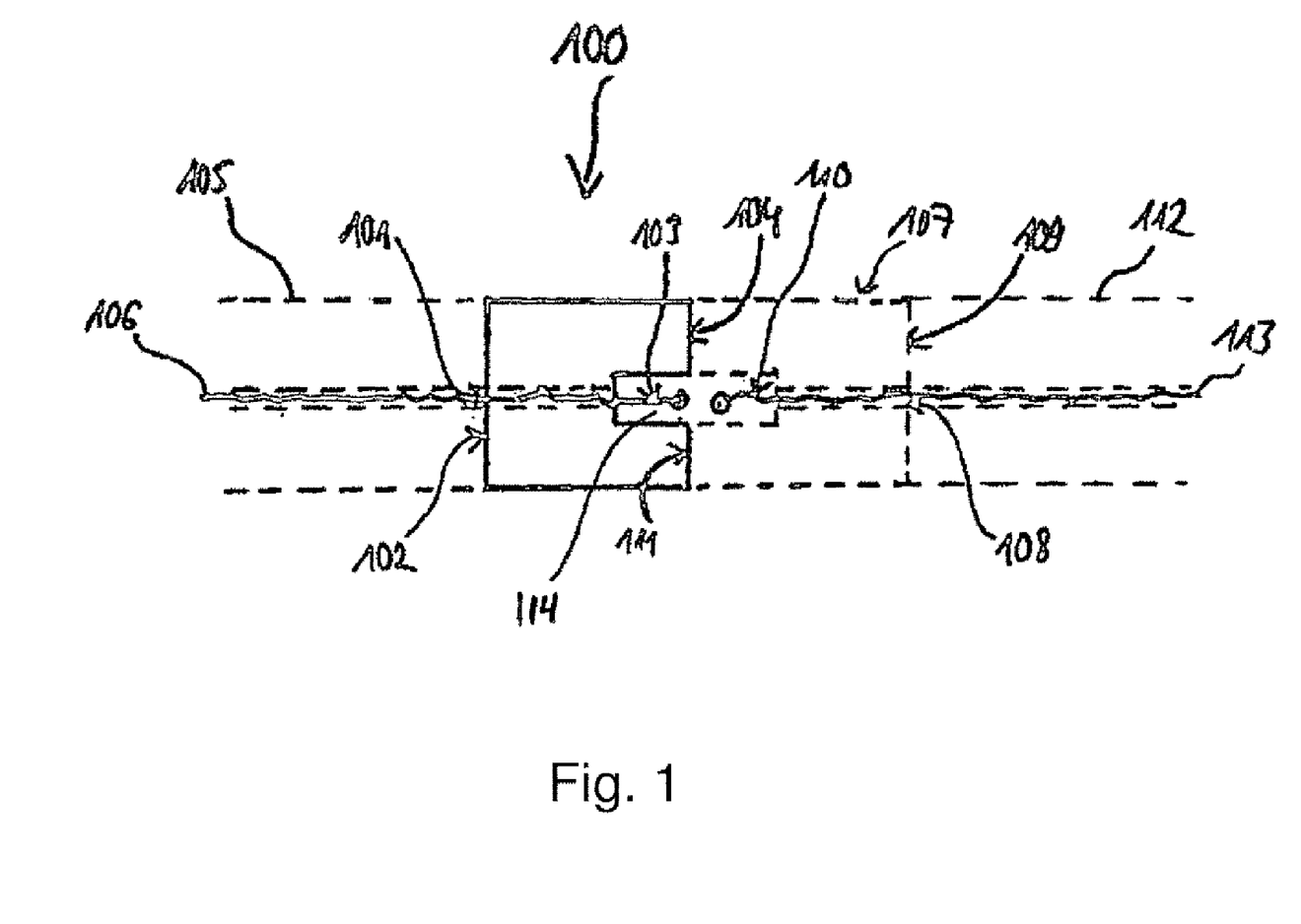
FIG. 1 a diagrammatic top view of a cable outlet element according to a first embodiment of the invention, FIGS. 2A to 2C perspective views of a cable outlet arrangement according to a first embodiment of the invention, FIG. 3A a perspective view of a cable outlet element according to a second embodiment of the invention, FIG. 3B a perspective view of a cable outlet device according to a first embodiment of the invention, FIG. 4A various views of a cable outlet element according to a third embodiment of the invention, FIG. 4B various views of a cable outlet element according to a fourth embodiment of the invention, FIG. 5A various views of a cable outlet element according to a fifth embodiment of the invention, FIG. 5B various views of a cable outlet element according to a sixth embodiment of the invention, FIG. 6A various views of a cable outlet element according to a seventh embodiment of the invention, FIG. 6B various views of a cable outlet element according to an eighth embodiment of the invention, FIG. 7A various views of a cable outlet element according to a ninth embodiment of the invention, FIG. 7B various views of a cable outlet element according to a tenth embodiment of the invention.

FIG. 1 shows a top view of the cable outlet element 100 according to the invention, and its coupling to another cable outlet element 107 as well as couplings of the cable outlet elements 100, 107 to raceway arrangements 105, 112. In this way a cable 106 can be inserted through the raceway arrangement 105, which comprises an upper cover, not shown in FIG. 1, into a cable lead-in section 101 of the cable outlet element 100. The cable 106 is routed through a partial region of the cable outlet element 100 below a cover, not shown in FIG. 1, and on the outlet aperture 114 exits from the cable outlet element 100 in order to be routed vertically upwards so as to be perpendicular to the drawing plane of FIG. 1. The led out cable 106 can be coupled to an electrical device (not shown) which is to be contacted by means of the cable 106.

In a similar way another cable 113 is first routed underneath a cover through the other raceway arrangement 112 and is fed in at another cable lead-in section 108 to the other cable outlet element 107 in order to be led out of the protective cover at the outlet aperture 114 so as to be perpendicular to the drawing plane of FIG. 1. The cable 113, too, can be coupled to an electrical device (not shown) in order to supply said device with electrical energy and/or with electrical signals.

The cable outlet element 100 and the other cable outlet element 107 are made in a single piece and of a single material, namely a plastic material, and are produced by injection-moulding technology.

Below, with reference to FIGS. 2A to 2C a cable outlet arrangement 200 according to a first embodiment of the invention is described.

Figure 2A:
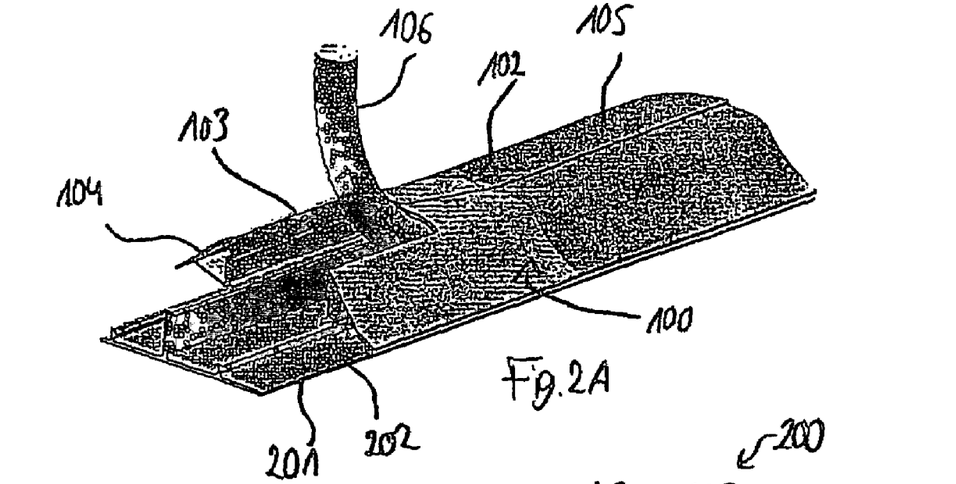

In FIG. 2A part of the cable outlet arrangement 200 is shown in a partially assembled state. According to FIG. 2A a raceway arrangement 105 is coupled to a cable outlet element 100. Furthermore, a cable 106 is led out of an outlet aperture on the cable lead-out section 103. Furthermore, FIG. 2A shows that on a bottom section the cable outlet element 100 comprises a push-on connection 202 to be pushed onto a guide rail 201. The raceway arrangement 105 is also pushed onto the guide rail 201 and at a raceway arrangement connection 102 is connected to the cable outlet element 100.

Thus, in order to obtain the configuration shown in FIG. 2A, the cable outlet element 100 and the raceway arrangement 105 are pushed onto the guide rail 201 and are slid along the guide rail 201 in such a way that a desired configuration and spatial arrangement of the cable outlet element 100 is achieved underneath an electrical device to be contacted.

Figure 2B:
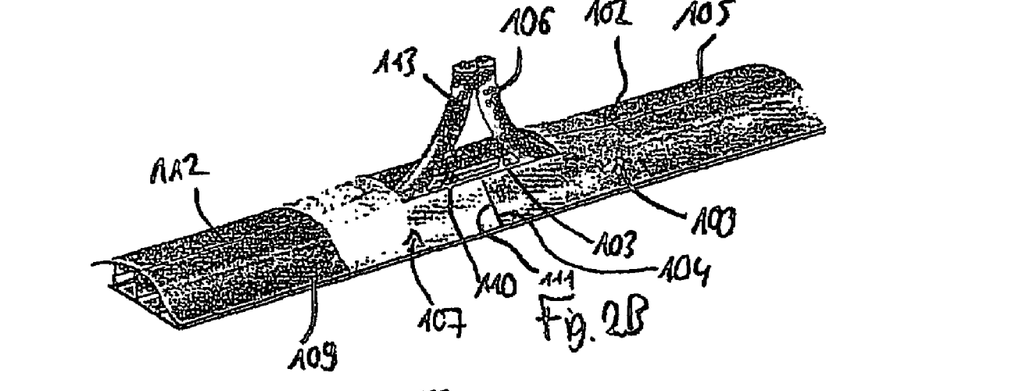

FIG. 2B shows a three-dimensional view of the cable outlet arrangement 200 in which starting from the arrangement shown in FIG. 2A first another cable outlet element 107 has been pushed onto the guide rail 201 at a push-on connection (not shown) and has been slid along the guide rail 201 in such a way that the cable outlet element 100 is directly adjacent to the other cable outlet element 107. Subsequently another raceway arrangement 112 is pushed onto the guide rail 201 and is slid along the guide rail 201 in such a way that the other raceway arrangement 112 adjoins the other cable outlet element 107. The second cable 113 is routed through the other raceway arrangement 112 and is led out at an outlet aperture in a border region between the cable outlet element 100 and the other cable outlet element 107.

Figure 2C:
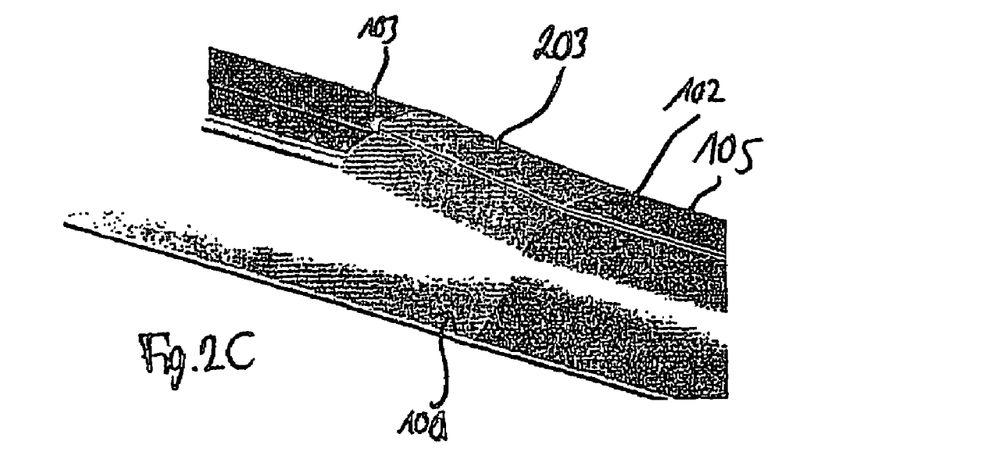

FIG. 2C shows an enlarged view of a border region between the cable outlet element 100 and the raceway arrangement 105. The cable lead-out section 103 is designed to lead out a cable 106 at a top side of the cable outlet element 100. As shown in FIG. 2C, the cable outlet element 100 comprises an inclined surface section 203 such that the inclined surface section 203 slants downwards from the cable lead-out section 103 to the cable lead-in section near the raceway arrangement connection 102.

This makes it possible for the cable 106 to be able to be led out of the cable outlet arrangement in accordance with its bending radius, without any damage and in a space-saving manner.

Each of the cable outlet elements of FIGS. 2A to 2C is designed as a cable leadthrough in an aircraft according to a single-aisle variant. A single cable can be fed through each of these cable outlet elements.

Below, with reference to FIG. 3A a cable outlet element 300 according to a second embodiment of the invention is described.

Figure 3A:
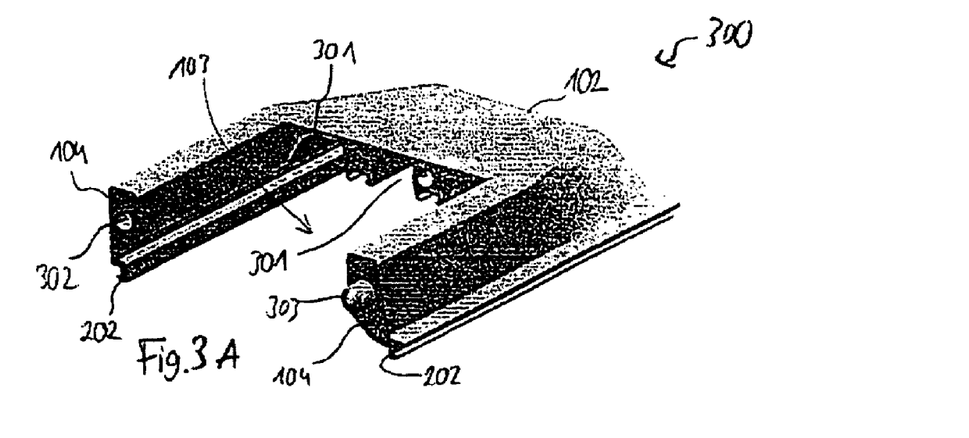

The cable outlet element 300, which is shown in a perspective view in FIG. 3A, comprises three cable leadthrough apertures 301, wherein in each case a cable can be routed through each of the three cable leadthrough apertures 301. Furthermore, a coupling groove 302 near a coupling outlet connection 104 is provided which is a plug-in element designed to engage a corresponding plug-in element (a projection or projecting end) on a cable outlet connection (not shown in FIG. 3A) of another cable outlet element to establish a plug-in connection. Furthermore, on another section of the cable outlet connection 104 a coupling projection 303 (a projection) is formed as a plug-in element which can be made to engage another plug-in element (not shown in FIG. 3A) (a groove) of a cable outlet connection of another cable outlet element to form a plug-in connection.

The cable outlet element 300 is designed as a cable leadthrough in an aircraft according to a long-range variant.

Below, with reference to FIG. 3B a cable outlet device 310 according to a first embodiment of the invention is described.

Figure 3B:
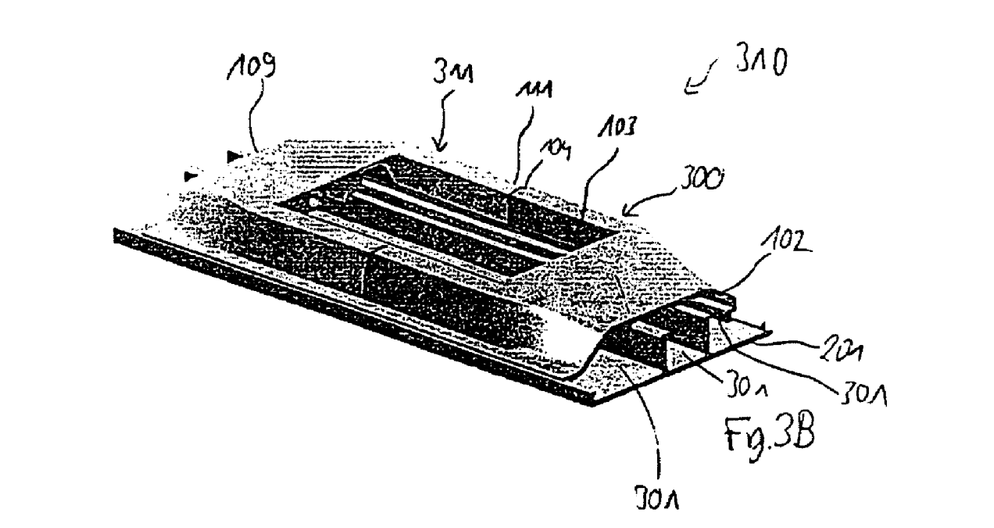

The cable outlet device 310 of FIG. 3B comprises the cable outlet element 300 shown in FIG. 3A as well as an additional cable outlet element 311, wherein the cable outlet elements 300, 311 are respectively pushed onto a guide rail 201 and together are plugged together on cable outlet connections 104, 111. To this effect the coupling groove 302 of the cable outlet element 300 engages a correspondingly provided coupling projection of the cable outlet element 311, and the coupling projection 303 of the cable outlet element 300 engages a corresponding coupling groove of the cable outlet element 311. As shown in FIG. 3B three different cables can be routed through three cable leadthrough apertures 301.

Below, with reference to FIG. 4A a cable outlet element 400 according to a third embodiment of the invention is described.

Figure 4A:
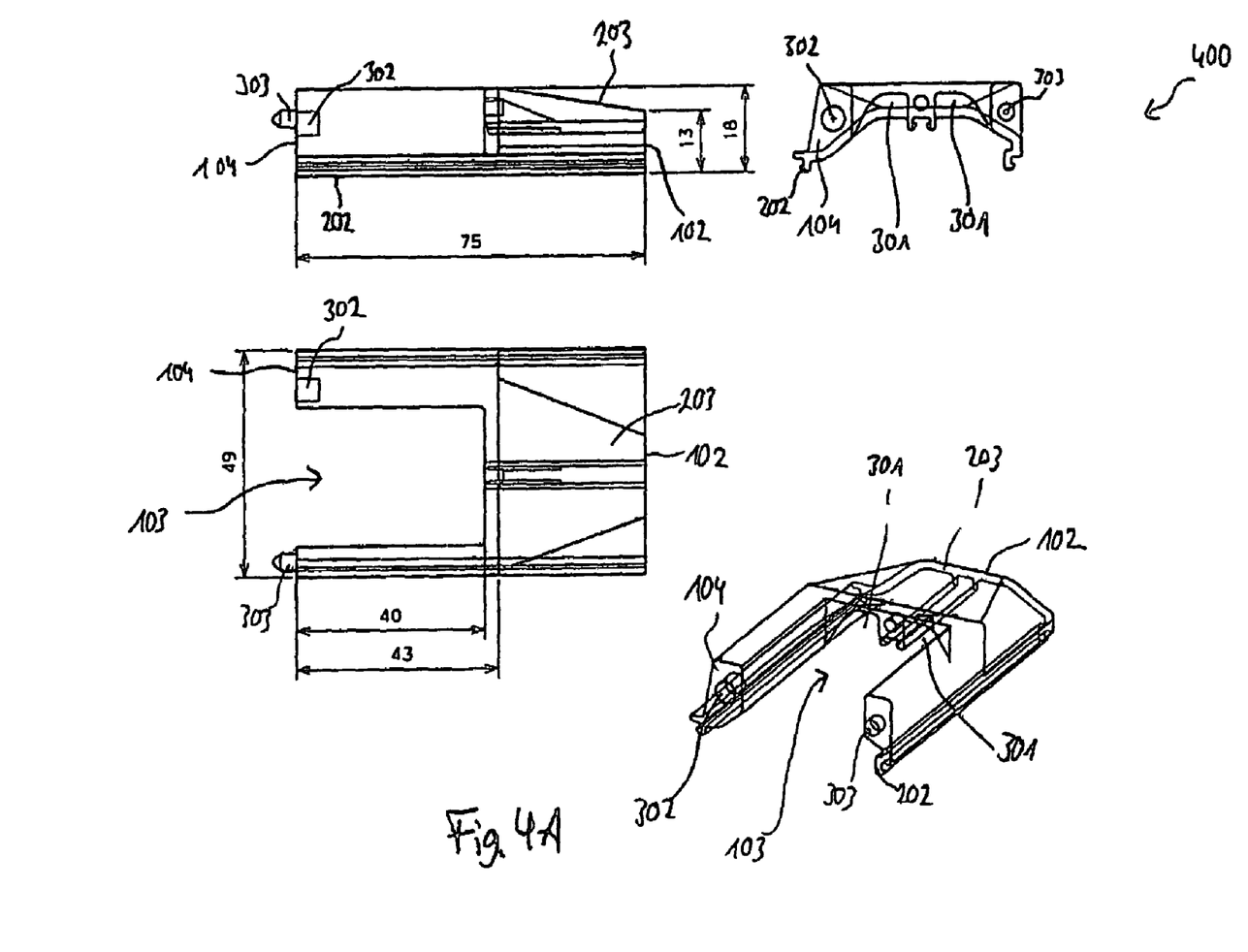

FIG. 4A shows various views (with dimensions) of the cable outlet element 400. The cable outlet element 400 is designed to lead two cables through two cable leadthrough apertures 301.

Below, with reference to FIG. 4B a cable outlet element 450 according to a fourth embodiment of the invention is described.

Figure 4B:
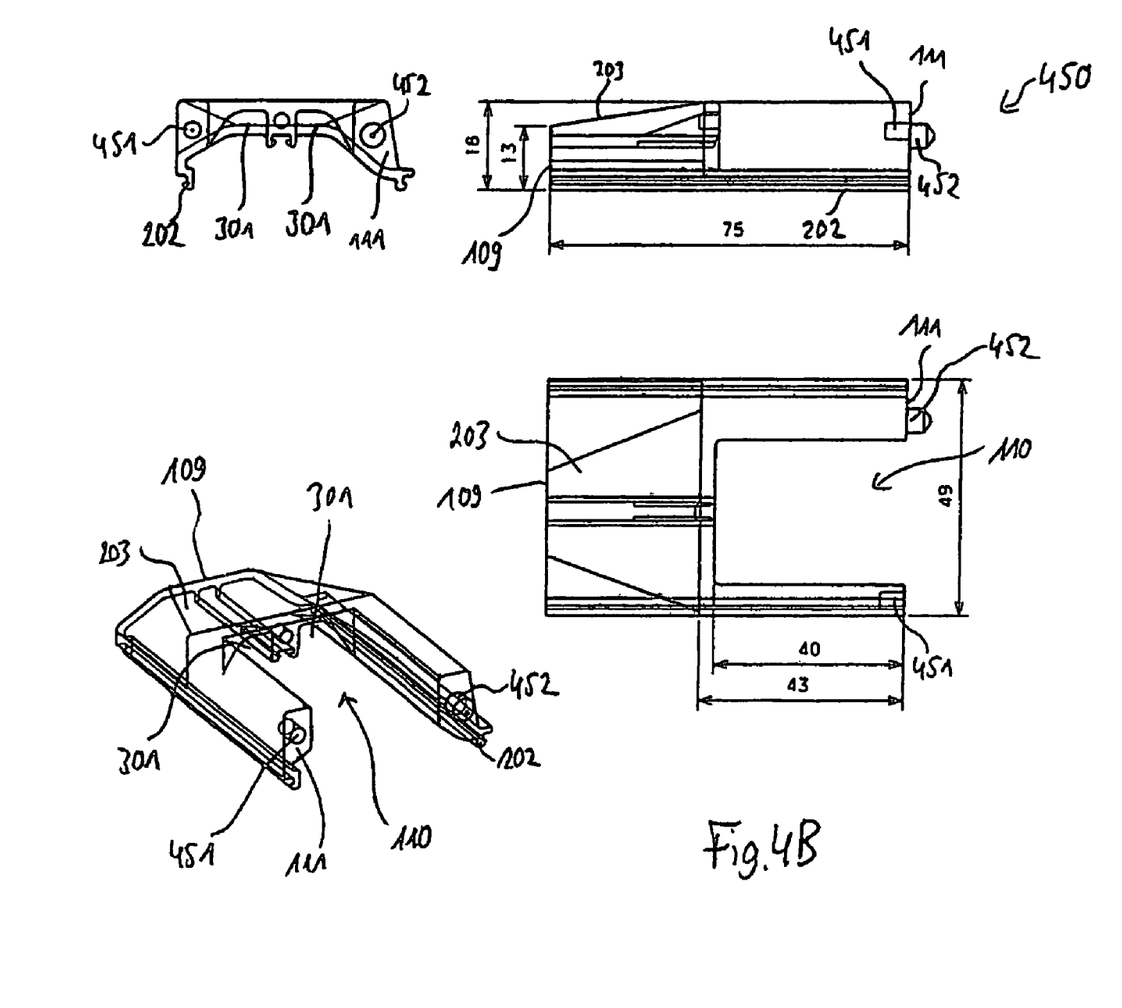

FIG. 4B shows various views (with dimensions) of the cable outlet element 450. At its cable outlet connection 111 the cable outlet element 450 comprises another coupling groove 451 and another coupling projection 452. The cable outlet element 450 is designed to lead two cables through cable leadthrough apertures 301. By providing the coupling groove 451 and the coupling projection 452 the cable outlet element 450 is further designed to be coupled to the cable outlet element 400 so as to form a cable outlet device. To this effect the cable outlet elements 400, 450 are to be pushed onto a guide rail (not shown in FIGS. 4A, 4B) and are to be slid on the guide rail in such a way that the coupling groove 302 engages the other coupling projection 452 and that the coupling projection 303 engages the other coupling groove 451 so that the cable lead-out section 103 and the other cable lead-out section 110 jointly form a lead-out aperture to lead out a total of up to four cables from the four cable leadthrough apertures 301.

Below, with reference to FIG. 5A a cable outlet element 500 according to a fifth embodiment of the invention is described.

Figure 5A:
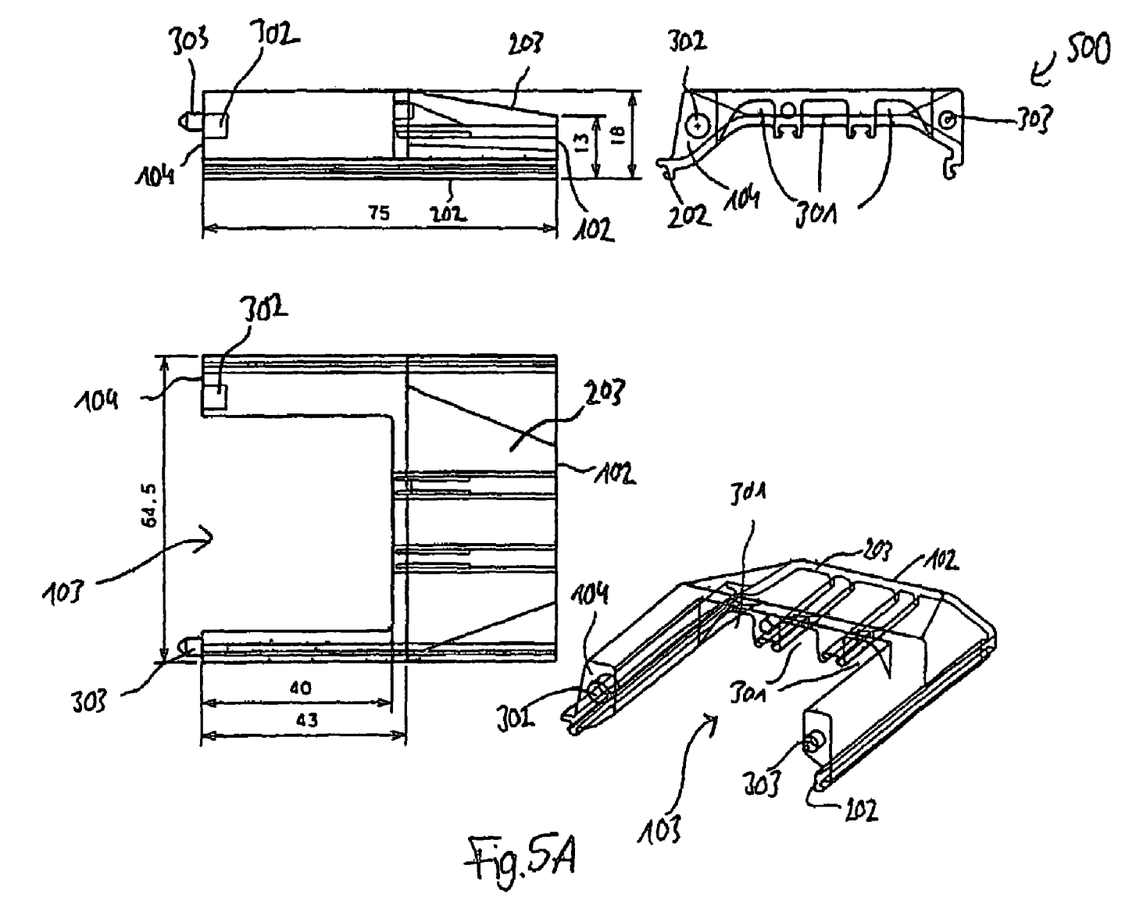

The cable outlet element 500 shown in FIG. 5A essentially differs from the cable outlet element 400 shown in FIG. 4A in that in the cable outlet element 500 three cable leadthrough apertures 301 to lead three cables through are provided, whereas in the cable outlet element 400 only two cable leadthrough apertures 301 to lead two cables through are provided.

Below, with reference to FIG. 5B a cable outlet element 550 according to a sixth embodiment of the invention is described.

Figure 5B:
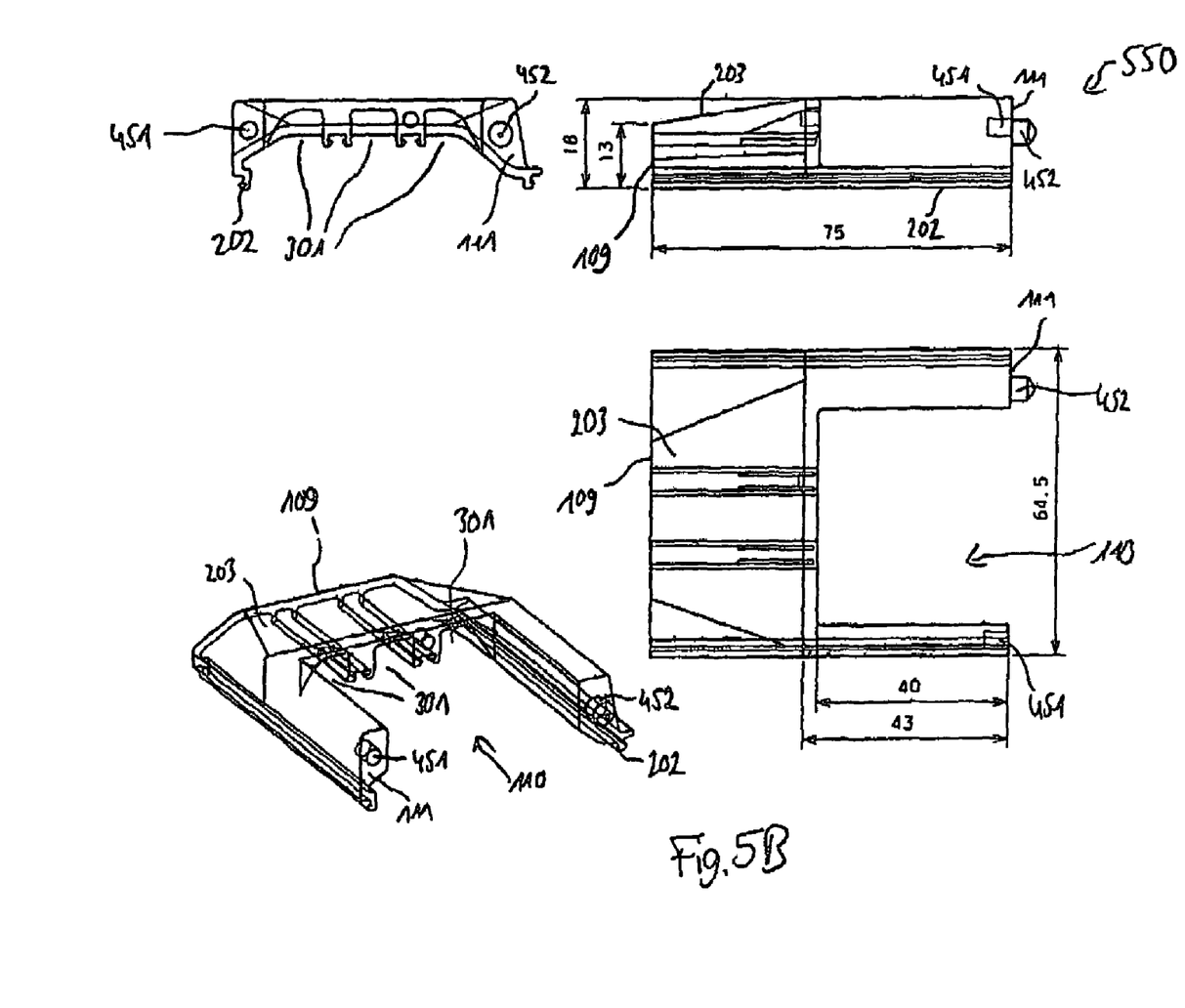

The cable outlet element 550 essentially differs from the cable outlet element 450 shown in FIG. 4B in that according to FIG. 5B three cable leadthrough apertures 301 to lead up to three cables through are provided, whereas according to FIG. 4B only two cable leadthrough apertures 301 to lead up to two cables through are provided.

If the coupling groove 302 from FIG. 5A is made to engage the other coupling projection 452 and if the coupling projection 303 from FIG. 5A is made to engage the other coupling projection 452 from FIG. 5B, then in this way a plug-in connection is produced and by means of the cable lead-out sections 103, 110 a lead-out aperture to vertically lead out the cables, of which there are up to six, in vertical direction according to the perspective views of FIGS. 5A, 5B is formed.

Figure 6A:
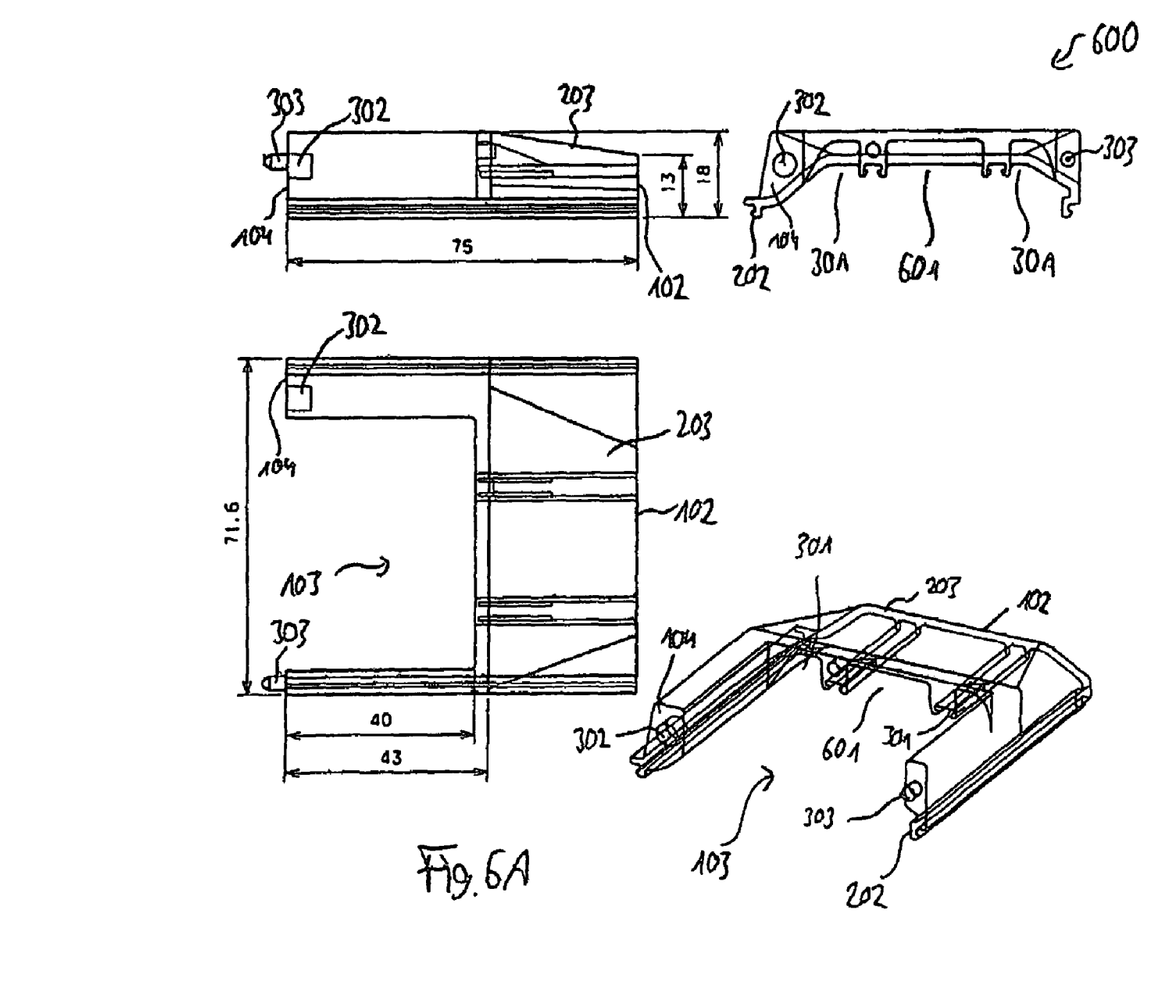

Below, with reference to FIG. 6A a cable outlet element 600 according to a seventh embodiment of the invention is described.

The cable outlet element 600 essentially differs from the cable outlet element 500 in that the middle, according to FIG. 5A, one of the three cable leadthrough apertures 301 as a three-cable leadthrough aperture 601 is designed to lead three cables through. To this effect the three-cable leadthrough aperture 601 is designed so as to be significantly wider than the cable leadthrough aperture 301.

Below, with reference to FIG. 6B a cable outlet element 650 according to an eighth embodiment of the invention is described.

In a way that differs to the design of the cable outlet element 550 in FIG. 5B, in the cable outlet element 650 the middle aperture of the three cable leadthrough apertures 301 is provided as a three-cable leadthrough aperture 601 in that cable leadthrough aperture 601 is provided to be significantly wider than the cable leadthrough aperture 301. If the cable outlet elements 600, 650 are connected by engagement of the plug-in elements 302, 303, 451, 452, then they form a cable outlet device for leading out a total of up to ten cables, i.e. two times five cables.

Figure 7A:
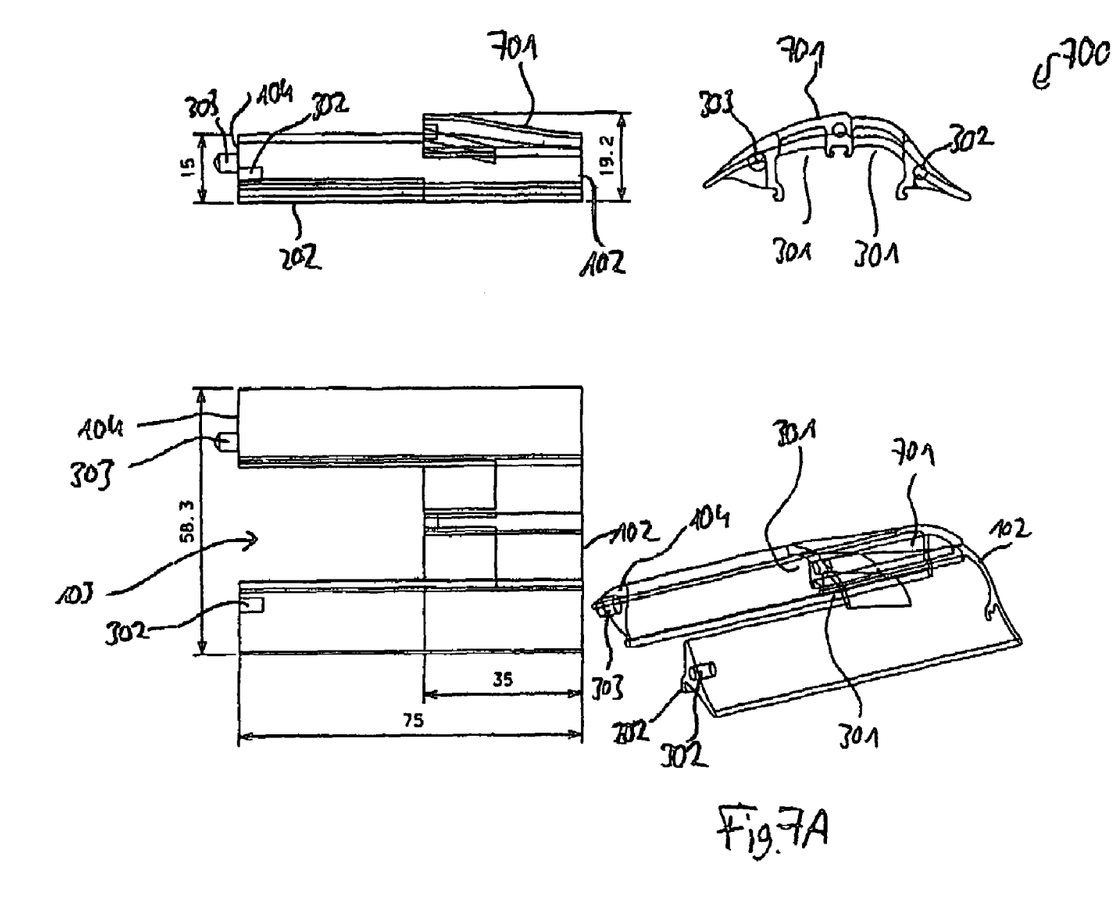

Below, with reference to FIG. 7A a cable outlet element 700 according to a ninth embodiment of the invention is described.

The cable outlet element 700 essentially differs from the cable outlet element 400 shown in FIG. 4A in that instead of a straight inclined surface section 203 a curved inclined surface section 701 is provided.

Figure 7B:
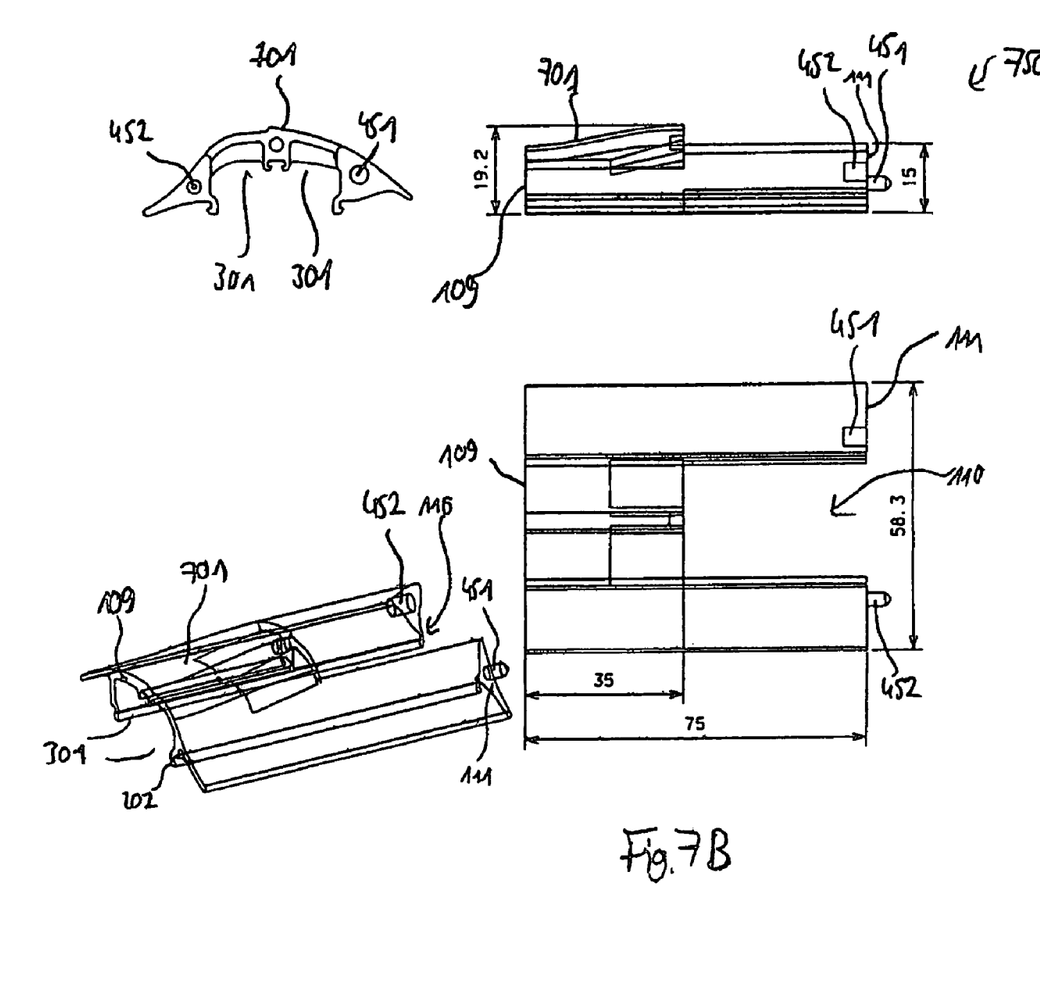
Figure 8:
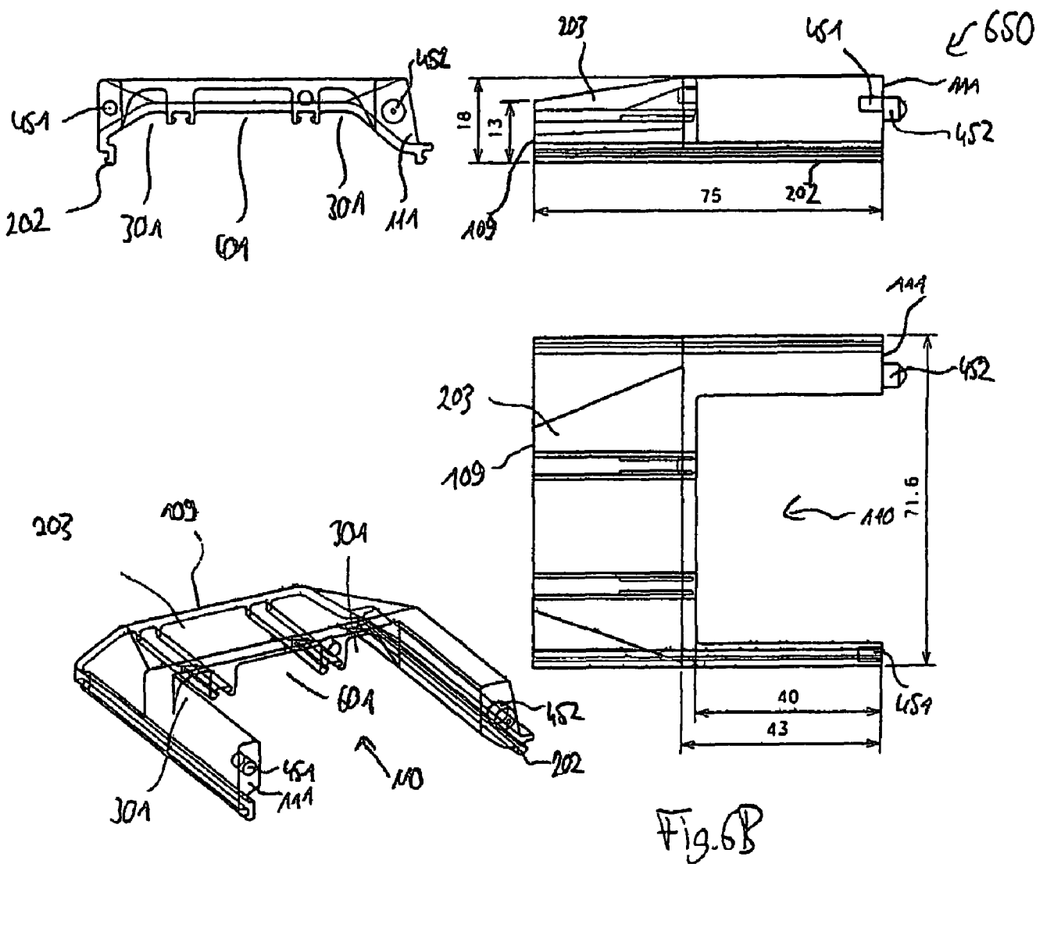

Below, with reference to FIG. 7B a cable outlet element 750 according to a tenth embodiment of the invention is described.

The cable outlet element 750 essentially differs from the cable outlet element 450 shown in FIG. 4B in that instead of the straight inclined surface section 203 a surface section 701 that is also inclined, but that is curved, is provided. The cable outlet element 750 can be made to engage the cable outlet element 700, and is thus connectable to said cable outlet element 700, by means of engaging the plug-in elements 302 and 452, and 303 and 451, respectively.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

The invention claimed is:

1. A cable outlet element for leading out a cable that can be routed through a raceway arrangement, the cable outlet element comprising:
   a cable lead-in section;
   a raceway arrangement connection;
   a cable lead-out section; and
   a cable outlet connection;
   wherein the raceway arrangement connection is connectable to a raceway arrangement in such a way that a cable that is routeable through the raceway arrangement can be fed into the cable lead-in section;
   wherein for the mutual forming of a cable outlet aperture the cable outlet connection is connectable to a cable outlet connection of another cable outlet element in such a way that at the connected cable outlet connections a cable fed into the cable lead-in section can be led out through the jointly formed cable outlet aperture;
   wherein the cable outlet connection comprises a plug in element which is designed in such a way that it can be made to engage a plug-in element of a cable outlet connection of another cable outlet element so as to form a plug-in connection.

2. The cable outlet element of claim 1, further comprising a push-on connection which is designed in such a way that with it the cable outlet element can be pushed onto a guide rail.

3. The cable outlet element of claim 2, wherein the push-on connection is designed in such a way that with it the cable outlet element can be slidably pushed onto a guide rail.

4. The cable outlet element of claim 1, wherein the cable lead-in section is designed to lead in a plurality of cables.

5. The cable outlet element of claim 1, wherein the cable lead-out section is designed to lead out a plurality of cables.

6. The cable outlet element of claim 5, wherein the cable lead-out section is designed to lead out a cable at a top side of the cable outlet element.

7. The cable outlet element of claim 6, which, on the top side, is inclinedly formed so that it slants downwards from the cable lead-out section to the cable lead-in section.

8. The cable outlet element of claim 1, wherein the cable outlet element is made in a single piece.

9. The cable outlet element of claim 1, wherein the cable outlet element is made of a single material.

10. The cable outlet element of claim 1, wherein the cable outlet element is adapted for leading a cable in an aircraft.

11. The cable outlet element of claim 10, wherein the cable outlet element is used for routing a cable to a seat in an aircraft.

12. The cable outlet element of claim 11, wherein the cable outlet element is used for routing a cable to a passenger entertainment system in the seat of an aircraft.

13. A cable outlet device for leading out a cable that can be routed through a raceway arrangement, the cable outlet element comprising a first and second cable outlet element, each cable outlet comprising:
   a cable lead-in section;
   a raceway arrangement connection;
   a cable lead-out section; and
   a cable outlet connection;
   wherein the raceway arrangement connection is connectable to a raceway arrangement in such a way that a cable that is routeable through the raceway arrangement can be fed into the cable lead-in section;
   wherein for the mutual forming of a cable outlet aperture the cable outlet connection is connectable to a cable outlet connection of another cable outlet element in such a way that at the connected cable outlet connections a cable fed into the cable lead-in section can be led out through the jointly formed cable outlet aperture;
   wherein the cable outlet connection comprises a plug in element which is designed in such a way that it can be made to engage a plug-in element of a cable outlet connection of another cable outlet element so as to form a plug-in connection; and wherein for jointly forming the cable outlet apertures, the cable outlet connection of the first cable outlet element is connectable to the cable outlet connection of the second cable outlet element in such a way that at the connected cable outlet connections a cable fed into at least one of the cable lead-in section is led out through the jointly formed cable outlet aperture.

14. The cable outlet device of claim 13, in which at the connection between the cable outlet connection of the first cable outlet element with the cable outlet connection of the second cable outlet element the cable outlet aperture is formed at the top side of the cable outlet device.

15. The cable outlet arrangement of claim 13, further comprising:
   a first raceway arrangement through which a cable is routable;
   a second raceway arrangement through which a cable is routable;
   wherein the first raceway arrangement is connectable to the raceway arrangement connection of the first cable outlet element, and the second raceway arrangement is connectable to the raceway arrangement connection of the second cable outlet element.

16. A method for producing a cable outlet element for leading out a cable that is routable through a raceway arrangement, comprising:
   forming a cable lead-in section;
   forming a raceway arrangement connection;
   forming a cable lead-out section;
   forming a cable outlet connection;
   wherein the raceway arrangement connection is formed in such a way that it is connectable to a raceway arrangement in such a way that a cable that is routable through the raceway arrangement can be fed into the cable lead-in section;
   wherein for the mutual forming of a cable outlet aperture the cable outlet connection is formed in such a way that it is connectable to a cable outlet connection of another cable outlet element in such a way that at the connected cable outlet connections a cable fed into the cable lead-in section can be led out through the jointly formed cable outlet aperture;
   wherein at the cable outlet connection a plug-in element is formed and which is designed in such a way that it can be made to engage a plug-in element of a cable outlet connection of another cable outlet element so as to form a plug-in connection.

17. The method of claim 16, in which the cable outlet element is produced as an injection-moulded part.

* * * * *

UNITED STATES PATENT AND TRADEMARK OFFICE
CERTIFICATE OF CORRECTION

| | | |
|---|---|---|
| PATENT NO. | : 7,696,433 B2 | |
| APPLICATION NO. | : 11/660439 | |
| DATED | : April 13, 2010 | |
| INVENTOR(S) | : Horst Winkelbach, Rene Gensler and Peter Platte | |

It is certified that error appears in the above-identified patent and that said Letters Patent is hereby corrected as shown below:

Title Page, Abstract, Item (57) line 2, "can be muted" should read
--can be routed--

Col. 10, line 11, insert -- - -- between "plug in"

Col. 10, line 63, insert -- - -- between "plug in"

Signed and Sealed this
Nineteenth Day of April, 2011

David J. Kappos
*Director of the United States Patent and Trademark Office*